United States Patent
Li

(10) Patent No.: US 9,584,293 B2
(45) Date of Patent: Feb. 28, 2017

(54) APPARATUS AND METHOD FOR CANCELLING INTER-CELL INTERFERENCE IN COMMUNICATION SYSTEM

(71) Applicant: Innovative Technology Lab Co., Ltd., Seoul (KR)

(72) Inventor: Jianjun Li, Seoul (KR)

(73) Assignee: INNOVATIVE TECHNOLOGY LAB CO., LTD., Seoul (KR)

( * ) Notice: Subject to any disclaimer, the term of this patent is extended or adjusted under 35 U.S.C. 154(b) by 259 days.

(21) Appl. No.: 14/530,501

(22) Filed: Oct. 31, 2014

(65) Prior Publication Data
US 2015/0124691 A1   May 7, 2015

(30) Foreign Application Priority Data
Nov. 1, 2013   (KR) .................. 10-2013-0132109

(51) Int. Cl.
*H04L 5/00* (2006.01)
*H04L 25/02* (2006.01)
(Continued)

(52) U.S. Cl.
CPC ............. *H04L 5/0073* (2013.01); *H04L 5/005* (2013.01); *H04L 25/0204* (2013.01);
(Continued)

(58) Field of Classification Search
CPC .... H04L 5/005; H04L 5/0073; H04L 25/0202; H04L 25/0204–25/0208; H04L 25/021; H04L 25/0224; H04L 25/0236; H04L 25/0242–25/0248; H04W 72/005; H04W 52/243; H04W 52/322; H04J 11/0023; H04J 11/0026; H04J 11/0036; H04J 11/004; H04J 11/0046; H04J 11/005; H04J 11/0053; H04J 11/0056
(Continued)

(56) References Cited

U.S. PATENT DOCUMENTS

| | | | |
|---|---|---|---|
| 2012/0320847 A1 | 12/2012 | Nam et al. | |
| 2013/0040578 A1* | 2/2013 | Khoshnevis | H04W 52/242 455/67.11 |

(Continued)

FOREIGN PATENT DOCUMENTS

KR   10-2010-0123587 A   11/2010

OTHER PUBLICATIONS

"3rd Generation Partnership Project; Technical Specification Group Radio Access Network; Network-Assisted Interference Cancellation and Suppression for LTE (Release 12)," 3GPP TR 36.863 V0.1.0, Apr. 2013, pp. 1-10, 3GPP Organizational Partners.
(Continued)

*Primary Examiner* — Mark Rinehart
*Assistant Examiner* — Kenneth P Hunt

(57) ABSTRACT

The present disclosure relates to an apparatus and method for canceling and/or suppressing inter-cell interference in a wireless communication. The method includes: establishing a Radio Resource Control (RRC) connection with a base station through a first serving cell; receiving, at a User Equipment (UE), an RRC message through the first serving cell, the RRC message comprising cell-specific reference signal (CRS) information of a neighbor cell and Physical Downlink Shared Channel (PDSCH) information of the neighbor cell, and the PDSCH information of the neighbor cell comprising a parameter relating to a power ratio of a CRS of the neighbor cell and a PDSCH of the neighbor cell; receiving the PDSCH through the first serving cell; performing a channel estimation for retrieving data from a PDSCH
(Continued)

of the first serving cell; and retrieving the data from the PDSCH of the first serving cell based on the second channel estimation.

20 Claims, 9 Drawing Sheets

(51) Int. Cl.
*H04W 52/24* (2009.01)
*H04W 52/32* (2009.01)
*H04W 72/00* (2009.01)

(52) U.S. Cl.
CPC ....... *H04W 52/243* (2013.01); *H04W 52/322* (2013.01); *H04W 72/005* (2013.01)

(58) Field of Classification Search
USPC .................. 370/312, 329; 455/63.1, 501–503
See application file for complete search history.

(56) References Cited

U.S. PATENT DOCUMENTS

| | | | | |
|---|---|---|---|---|
| 2013/0114437 A1* | 5/2013 | Yoo | ........................ | H04J 11/005 370/252 |
| 2013/0114517 A1* | 5/2013 | Blankenship | ......... | H04L 5/0053 370/329 |
| 2014/0254516 A1* | 9/2014 | Lee | ..................... | H04W 74/002 370/329 |
| 2014/0357255 A1* | 12/2014 | Jonsson | ................. | H04W 52/16 455/422.1 |
| 2015/0098440 A1* | 4/2015 | Yang | ..................... | H04J 11/0056 370/330 |
| 2015/0124691 A1* | 5/2015 | Li | ........................... | H04L 5/005 370/312 |
| 2015/0271830 A1* | 9/2015 | Shin | ........................ | H04L 1/206 370/329 |
| 2015/0289280 A1* | 10/2015 | Davydov | ............... | H04W 72/12 370/252 |
| 2015/0372779 A1* | 12/2015 | Lim | ........................ | H04J 11/005 370/338 |
| 2016/0119936 A1* | 4/2016 | Kim | ..................... | H04J 11/0053 370/329 |
| 2016/0353317 A1* | 12/2016 | Kim | ..................... | H04J 11/0056 |

OTHER PUBLICATIONS

"Interference Measurements based on CSI-RS", 3GPP TSG RAN1 #67, Nov. 14-18, 2011, pp. 1-5, R1-114023, Motorola Mobility, San Francisco, USA.
"Consideration on necessary signaling for non-zero transmit power ABS", 3GPP TSG RAN WG1 Meeting #68bis, Mar. 26-30, 2012, pp. 1-5, R1-121429, LG Electronics, Jeju, Korea.
International Search Report for International Patent Application No. PCT/KR2014/010343, dated Jan. 27, 2015.
Written Opinion for International Patent Application No. PCT/KR2014/010343, dated Jan. 27, 2015.

* cited by examiner

APPARATUS AND METHOD FOR CANCELLING INTER-CELL INTERFERENCE IN COMMUNICATION SYSTEM

CROSS-REFERENCE TO RELATED APPLICATION

This application claims priority from and the benefit of Korean Patent Application No. 10-2013-0132109, filed on Nov. 1, 2013, which is hereby incorporated by reference in its entirety.

BACKGROUND

1. Field

The present disclosure relates to a wireless communication, more particularly, to an apparatus and method for canceling or reducing inter-cell interference in a wireless communication system.

2. Discussion of the Background

In general, in a multi-cellular communication system, each cell does not consider other cells and when a base station and a user equipment communicate with each other while maintaining frequency reuse as '1' at the same time and in the same frequency band, a UE that is positioned to be closer to a cell boundary is significantly degraded due to distortion of a signal caused by power reduction of a received signal and interferences from other cells Various techniques have been researched up to now in order to overcome a performance degradation phenomenon by the power reduction and the interferences and as one technique thereof, a coordinated multiple point (CoMP) scheme in which multiple cells or multiple transmission terminals are coordinated with each other has been discussed. The coordinated multiple point scheme (CoMP) may also be called a cooperative transmission and reception scheme. The CoMP generally designates a method in which different base stations or multiple transmission terminals are coordinated with each other to perform communication with the same UE. That is, in the above scheme, a plurality of base stations share information on a cell and performs downlink transmission or uplink reception. The CoMP includes the case in which the plurality of base stations are coordinated with each other to perform downlink or downlink scheduling in order to efficiently distribute radio resources.

This scheme can improve a transmission power gain and signal and signal sensitivity of UEs having the lower strength of the signal than a UE that is positioned in a central region of the cell in a region where signal receiving sensitivity is high because the UEs are positioned in a cell-edge region or a region where the signal receiving sensitivity is low and improve transmission rate of an entire system by effectively removing an influence by interference.

However, according to this scheme, since reference signals (hereinafter, referred to as RSs) cannot be blanked, there is a problem that interferences a cell-specific RS (CRS) and a CSI-RS transmitted from the CoMPs are not removed.

SUMMARY

Exemplary embodiments of the present invention relates to an apparatus and method for canceling or reducing inter-cell interference in a wireless communication system.

An exemplary embodiment of the present invention provides a method of performing a wireless communication in an inter-cell interference environment, the method including: establishing a Radio Resource Control (RRC) connection with a base station through a first serving cell; receiving, at a User Equipment (UE), an RRC message through the first serving cell, the RRC message including cell-specific reference signal (CRS) information of a neighbor cell and Physical Downlink Shared Channel (PDSCH) information of the neighbor cell, and the PDSCH information of the neighbor cell including a parameter relating to a power ratio of a CRS of the neighbor cell and a PDSCH of the neighbor cell; receiving the PDSCH through the first serving cell; performing a channel estimation for retrieving data from a PDSCH of the first serving cell.

The channel estimation includes: performing a first channel estimation for the PDSCH of the first serving cell based on a CRS of the first serving cell; based on interference information of the CRS of the neighbor cell, canceling an interference of the CRS of the neighbor cell from the first channel estimation; and based on the parameter relating to the power ratio of the CRS of the neighbor cell and the PDSCH of the neighbor cell, performing a second channel estimation for the PDSCH of the first serving cell by canceling an interference of the PDSCH of the neighbor cell. The method retrieves the data from the PDSCH of the first serving cell based on the second channel estimation.

An exemplary embodiment of the present invention provides a method of performing a wireless communication in an inter-cell interference environment, the method including: establishing a Radio Resource Control (RRC) connection with a User Equipment (UE) through a first serving cell; transmitting, to the UE, an RRC message through the first serving cell, the RRC message including cell-specific reference signal (CRS) information of a neighbor cell and Physical Downlink Shared Channel (PDSCH) information of the neighbor cell, and the PDSCH information of the neighbor cell including a parameter relating to a power ratio of a CRS of the neighbor cell and a PDSCH of the neighbor cell; and transmitting the PDSCH through the first serving cell.

The parameter relating to the power ratio of the CRS of the neighbor cell and the PDSCH of the neighbor cell is configured for the UE to cancel an interference of the PDSCH of the neighbor cell in retrieving data from the PDSCH of the first serving cell.

As inter-cell interferences of a wireless communication system are removed or suppressed, transmission performance of a PDSCH is improved.

DETAILED DESCRIPTION OF THE ILLUSTRATED EMBODIMENTS

Figure 1:
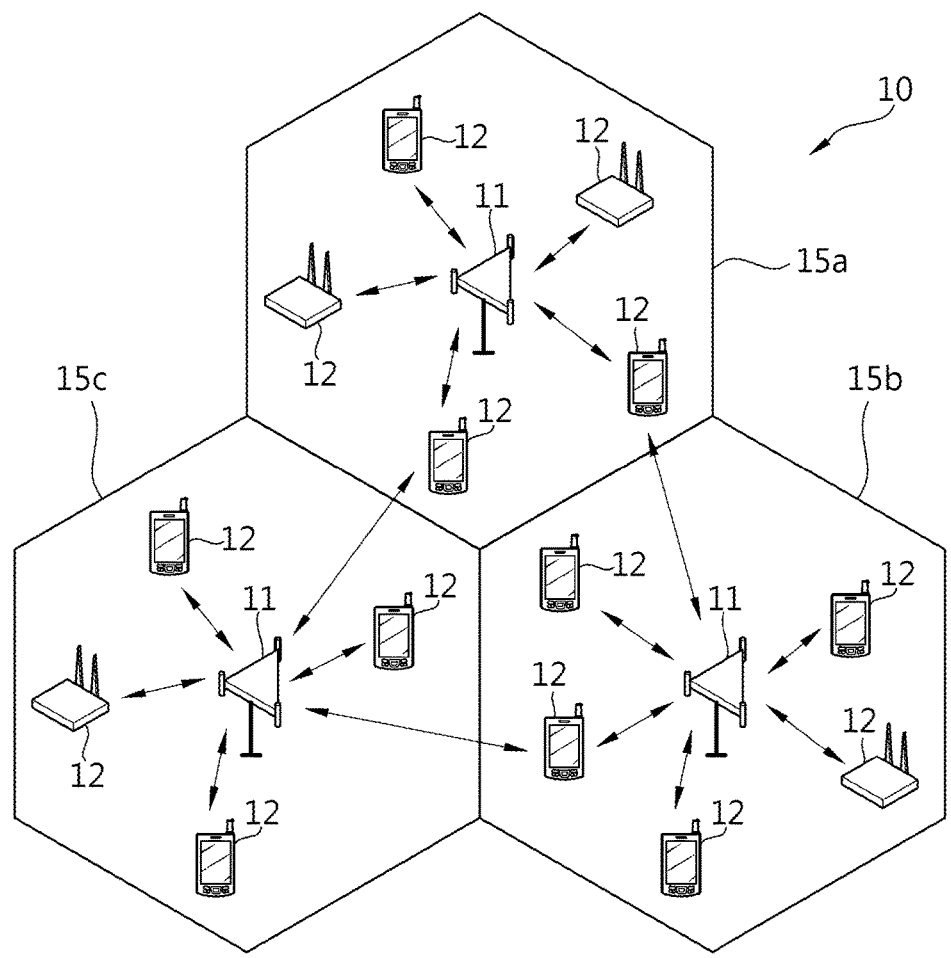
FIG. 1 illustrates a wireless communication system according to an embodiment of the present invention.

Herein, some embodiments will be described in detail with reference to the accompanying drawings in the present invention. When reference numerals refer to components of each drawing, it is to be noted that although the same components are illustrated in different drawings, the same components are referred to by the same reference numerals as possible. In describing the embodiments of the present invention, when it is determined that the detailed description of the known art related to the present invention may obscure the gist of the present invention, the detailed description thereof will be omitted.

Further, the specification primary describes a communication network, and a task performed in the communication network may be achieved during a process controlling the network and transmitting data in a system (for example, a base station) that controls the corresponding communication network or the task may be achieved in a user equipment linked to the corresponding network.

Technology described below may be used in various wireless communication systems including code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as Institute of Electrical and Electronics Engineers (IEEE) 802.11 (Wi-Fi), IEEE 802.16 (WiMAX), IEEE 802-20, E-UTRA (Evolved UTRA), and the like. IEEE 802.16m as the evolution of IEEE 802.16e provides backward compatibility with a system based on the IEEE 802.16e. The UTRA is a part of a universal mobile telecommunication system (UMTS). $3^{rd}$ generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The LTE-A is primarily described for clear description, but the spirit of the present invention is not limited thereto.

FIG. 1 illustrates a wireless communication system according to an embodiment of the present invention.

Referring to FIG. 1, the wireless communication system 10 is widely placed to provide various communication services such as voice, packet data, and the like. The wireless communication system 10 includes at least one base station (BS) 11. Each base station 11 provides a communication service to a specific geographical region or a frequency region and may be called a site. The site may be divided into a plurality of regions 15a, 15b, and 15c which may be called a sector and the sector may have different cell IDs.

A user equipment (UE) 12 may be fixed or movable and may be called other terms such as a mobile station (MS), a mobile terminal (MT), a user terminal (UT), a subscriber station (SS), a wireless device, a personal digital assistant (PDA), a wireless modem, a handheld device, and the like. The base station 11 generally indicates a station that may communicate with the UE 12 and may be called other terms such as an evolved-NodeB (eNodeB), a base transceiver system (BTS), an access point, a femto base station (eNB), a home eNodeB (HeNB), a relay, a remote radio head (RRH), and the like. The cells 15a, 15b, and 15c should be analyzed as a comprehensive meaning representing a partial region covered by the base station 11 and represents a meaning including all of various coverage regions including a mega cell, a macro cell, a micro cell, a pico cell, a femto cell, and the like.

The user equipment generally belongs to one cell (that is, a communication link is configured) and the cell to which the user equipment belongs is referred to as a serving cell. A base station that provides the communication service to the serving cell is referred to as a serving base station (BS). Since the wireless communication system is a cellular system, another cell which is adjacent to the serving cell is present. Another cell which is adjacent to the serving cell is referred to as a neighbor cell. A base station that provides the neighbor cell is referred to as a neighbor BS. The serving cell and the neighbor cell are relatively determined based on the UE.

The embodiment of the present invention may be used in a downlink or an uplink. In general, the downlink means communication from the base station 11 to the UE 12 and the uplink means communication from the UE 12 to the base station 11. In the downlink, a transmitter may be a part of the base station 11 and a receiver may be a part of the user equipment 12. In the uplink, the transmitter may be a part of the UE 12 and the receiver may be a part of the base station 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream, and the receive antenna means a physical or logical antenna used to receive one signal or stream.

The wireless communication system may be generally divided into a frequency division duplex (FDD) scheme and a time division duplex (TDD) scheme. According to the FDD scheme, uplink transmission and downlink transmission are performed while occupying different frequency bands. According to the TDD scheme, the uplink transmission and the downlink transmission are performed at different timings while occupying the same frequency band. A channel response of the TDD scheme is substantially reciprocal. This means that a downlink channel response and an uplink channel response are almost the same as each other in a given frequency domain. Accordingly, in the wireless communication system based on the TDD, the downlink channel response may be advantageously acquired from the uplink channel response. In the TDD scheme, since an entire frequency bands are time-divided into the uplink transmission and the downlink transmission, the downlink transmission by the base station and the uplink transmission by the user equipment may not simultaneously be performed. In the TDD system in which the uplink transmission and the downlink transmission are divided by the unit of the subframe, the uplink transmission and the downlink transmission are performed in different subframes.

Figure 2:
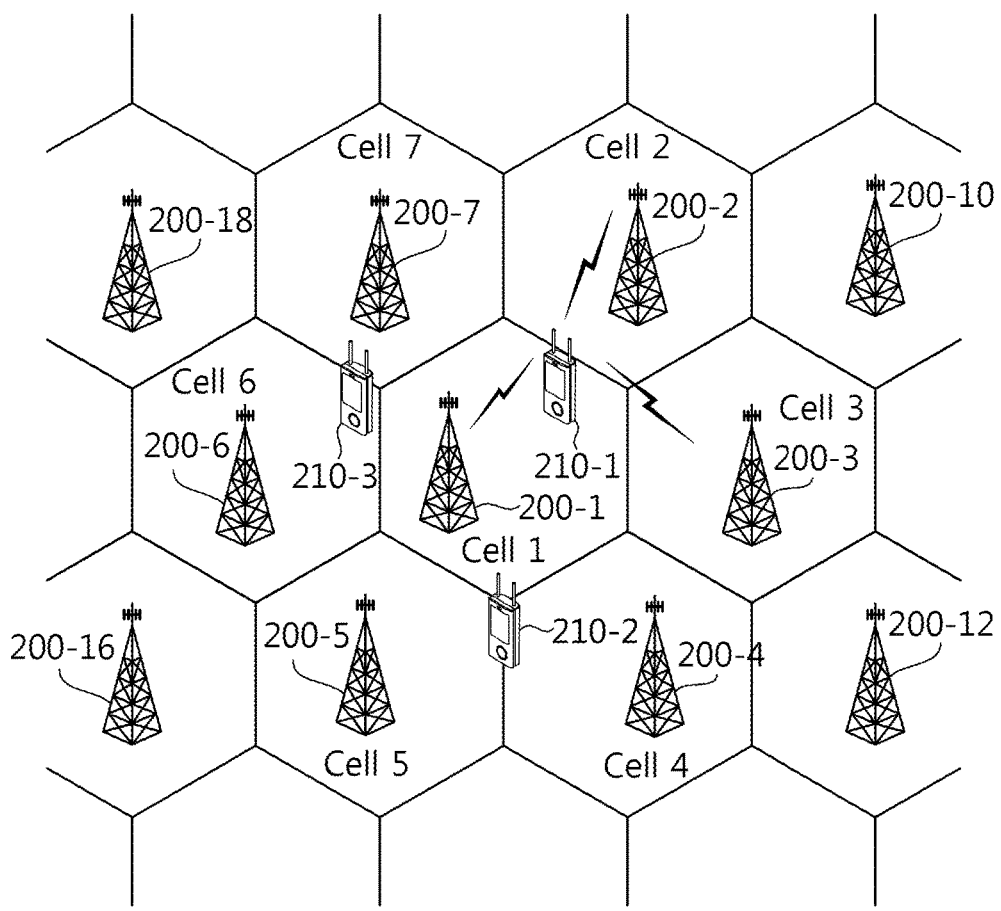
FIG. 2 is a diagram illustrating a communication system that supports a coordinated multiple point scheme.

FIG. 2 is a diagram illustrating a communication system that supports an applicable coordinated multiple point scheme of the present invention.

Referring to FIG. 2, the communication system includes a plurality of eNB1 200-1, eNB2 200-2 . . . and UE1 210-1, UE2 210-2, and UE3 210-3.

Each eNB provides one cell. The UE 210-1 is positioned at edges of a first cell Cell1, a second cell Cell2, and a third cell Cell3. The eNB1 200-1, the eNB2 200-2, and the Enb3 200-3 as coordinated eNBs transmit signals to the UE1 210-1 based on the coordinated multiple point scheme.

Each of the coordinated eNBs include a primary eNB (hereinafter, referred to as PeNB) and a secondary eNB (hereinafter, referred to as SeNB). The PeNB has a priority in scheduling among coordinated cells. That is, the PeNB takes the lead in the scheduling in the coordinated multiple point scheme and the SeNB performs the scheduling so as to prevent a collision from being occurred in a scheduling result determined by the PeNB. A cell provided by the PeNB is referred to as a primary cell and a radio link formed by the primary cell and the UE is referred to as a primary cell link. In addition, a cell provided by the SeNB is referred to as a secondary cell and a radio link formed by a secondary cell and the UE is referred to as a secondary cell link. The SeNB may be called a neighboring eNB (neighboring BS) or other eNB (other BS). The PeNB may transmit not only downlink scheduling information thereof but also downlink scheduling information of the SeNB.

In FIG. 2, the first cell Cell1 is the primary cell in respect to the UE1 210-1 and the eNB1 200-1 is the PeNB. Meanwhile the second cell Cell2 and the third cell Cell3 are the secondary cells, and the eNB2 200-1 and the eNB3 200-3 are the SeNBs.

FIG. 2 illustrates only one example of performing the coordinated multiple point scheme in which the PeNB and the SeNB are coordinated to the UE positioned at the cell edge and the positions, the number, and the like of eNBs and cells that perform the coordinated multiple point scheme. The coordinated eNB may be appropriately determined by considering a distance between the UE and the neighboring eNB, an SINR, spectral efficiency, and the like.

Figure 3:
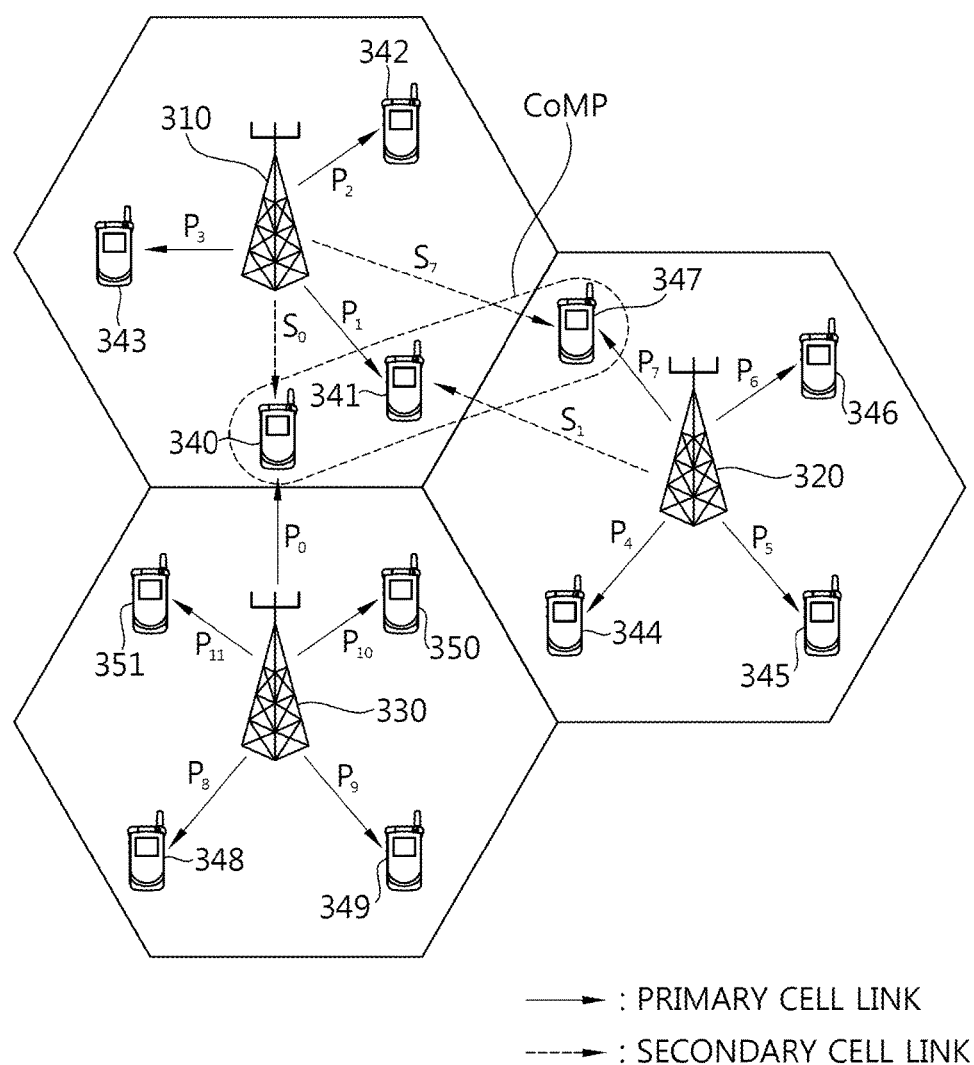
FIG. 3 is a diagram for describing one example of a system operating scenario according to the coordinated multiple point scheme.

FIG. 3 is a diagram for describing one example of a system operating scenario according to the coordinated multiple point scheme. This indicates the case in which the PeNB and the SeNB are dynamically configured depending on the UE.

Referring to FIG. 3, an eNB1 310, an eNB2 320, and an eNB3 330 are determined as the coordinated eNBs. A UE1 341, a UE2 342, and a UE3 343 are connected to a cell provided by the eNB1 310 through the primary cell link. A UE4 344, a UE5 345, a UE6 346, and a UE7 347 are connected to a cell provided by the eNB2 320 through the primary cell link. A UE8 348, a UE9 349, a UE10 350, and a UE11 351 are connected to a cell provided by the eNB3 330 through the primary cell link.

The UE0 340, the UE1 341, and the UE7 347 thereamong are UEs that may receive signals from two or more base stations operate in the coordinated multiple point scheme in order to increase a communication capacity. The residual UEs operate not the coordinated multiple point scheme but a general communication scheme.

The UEs that operate according to the general communication scheme have only one primary cell link. For example, the UE2 342 and the UE3 343 are connected with the eNB1 310 through primary cell links $P_2$ and $P_3$, respectively. The UE4 344, the UE5 345, and the UE6 346 are connected with the eNB2 320 through primary cell links $P_4$, $P_5$, and $P_6$, respectively. In addition, the UE8 348, the UE9 349, the UE10 350, and the UE11 351 are connected with the ENB3 330 through primary cell links $P_8$, $P_9$, $P_{10}$, and $P_{11}$, respectively.

Since two or more eNBs are coordinated to one UE to perform communication according to the coordinated multiple point scheme, two or more cell links are formed. For example, the UE0 340 is connected with the eNB1 310 through a secondary cell link $S_0$ and connected with the eNB3 330 through a primary cell link $P_0$. The UE 341 is connected with the eNB1 310 through a primary cell link $P_1$ and connected with the eNB2 320 through a secondary cell link $S_1$. In addition, the UE7 347 is connected with the eNB1 310 through a secondary cell link $S_7$ and connected with the eNB3 330 through a primary cell link $P_7$.

Although the UE0 340, the UE1 341, and the UE7 347 operate according to the coordinated multiple point scheme, the PeNB and the SeNB are relatively determined for each UE. In FIG. 3, the PeNB for the UE0 340 is the eNB3 330, the PeNB for the UE1 341 is the eNB1 310, and the PeNB for the UE7 347 is the eNB2 320.

In the wireless communication system, an uplink channel and a downlink channel needs to be estimated for transmission/reception of data, acquisition of system synchronization, feed-back of channel information, and the like. In the wireless communication system, fading occurs due to a multiple-path time delay. A process of restoring a transmission signal by correcting distortion of a signal which occurs by a rapid environmental change due to the fading is referred to as channel estimation. Further, a channel state for a cell to which the UE belongs or other cell needs to be measured. The channel estimation is generally performed by using a reference signal which a transmitter and a receiver mutually know for the channel estimation or the measurement of the channel state.

Downlink reference signals include a cell-specific RS (CRS), a multimedia broadcast and multicast single frequency network (MBSFN) reference signal, a UE-specific RS, a positioning RS (PRS), and channel state information (CSI) reference signal (CSI-RS). The CRS as a reference single transmitted to all UEs in the cell may be used in channel estimation for feed-back of a channel quality indicator (CQI) and channel estimation for a PDSCH. The MBSFN reference signal may be transmitted in a subframe allocated to MBSFN transmission. The UE-specific reference signal as a reference signal received by a cell-specific or a specific UE group may be called a demodulation RS (DMRS). The DMRS is primarily used for the specific UE or the specific UE group to demodulate data. The PRS may be used to estimate the position of the UE. The CRI-RS is used for channel estimation of a PDSCH of a LTE-A UE.

The CSI-RS configuration may be divided into a non-zero transmission power CSI-RS configuration indicating a pattern where the CSI-RS is transmitted to the UE of each cell (alternatively, a transmission point (TP)) and a zero transmission power CSI-RS configuration for muting the PDSCH region corresponding to the CSI-RS transmission of a neighbor cell (alternatively, the TP). 0 or 1 CSI-RS configuration is used for the UE assuming the non-zero transmission power CSI-RS, and 0 or several CSI-RS configurations may be used for the UE assuming the zero transmission power CSI-RS.

Information on one or more non-zero transmission power CSI-RS configurations (hereinafter, referred to as the CSI-RS configuration) may be transmitted to each UE of the corresponding cell. Information on the CSI-RS configuration may include information of 2 bits indicating whether the number of antenna ports (hereinafter, referred to as CSI-RS antenna ports) transmitting the non-zero transmission power CSI-RS is one of 1, 2, 4, and 8, and information of 5 bits indicating the CSI-RS pattern which may be configured for each number of CSI-RS antenna ports.

In the embodiment, network assisted interference cancellation and suppression (hereinafter, referred to as NAICS) assisted by the network is used. In the NAICS, in order to suppress intra-cell and inter-cell interference in the receiver side, the network transmits additional information on the interference to the receiver. As compared with a technique in the transmitter side such as the CoMP which causes deterioration of performance due to the lack of the channel information in the transmitter side depending on the limited feedback, the NAICS receiver has no load on the CSI feedback.

In the NAICS, suppressing the interference due to the PDSCH of the neighbor cell has a high priority. According to the embodiment of the present invention, the interference due to the PDSCH may be suppressed by using optimized necessary network information. Further, serious CRS interference may occur in a new carrier type (NCT) and a small cell. According to the embodiment of the present invention, the CRS interference may be also efficiently removed.

In this specification, a method for minimizing the interference of the PDSCH, the CRS and the CSI-RS at the UE side based on the NAICS scheme is disclosed. According to the method, the eNB transmits related RS information and data symbol power information in order to suppress the interference of the PDSCH. The method may premise the interference of the CRS and the CSI-RS of the neighbor eNB generated in the CoMP scheme. In this case, the eNB may transmit, to the UE, PDSCH rate matching, a quasi co-located (QCL) field, and interference information of the CRS and the CSI-RS of the neighbor eNB to be removed and cancelated.

In order to transmit PDSCH RE mapping and QCL information to the UE, the eNB may configure several PDSCH rate matching and sets of the QCL by a radio resource control (RRC). Different sets indicate different PDSCH staring points, CRS patterns, and QCL of ZP-CSI-RS and DMRS. The sets which may be used in the subframe according to the embodiment of the present invention may be indicated by a DCI format 2D. Fields to be transmitted to the UE which may be used in the embodiment of the present invention is as the following Table 1.

TABLE 1

| Field | Content |
|---|---|
| $n_{CRS}$ | The number of CRS ports 1, 2, 4, and integer values including preliminary values which are not attached to Rel-11 UE form |
| $v_{shift}$ | Position on frequency domain of CRS Integer in range of [0, 5] |
| MBSFN subframe configuration | MBSFN subframe configuration |

TABLE 1-continued

| Field | Content |
|---|---|
| PDSCH-Start-Sym | PDSCH-Start Symbol {0 or preliminary value (FFS), 1, 2, 3, and 4 (4 may be applied only when system BW <=10PRB) as value indicated by PCFICH of serving cell in the case of non-cross-carrier-scheduling or values set in upper layer in the case of cross-carrier-scheduling |
| zeroTxPowerCSI-RS | zeroTxPowerResourceConfigList, and ZP CSI-RS set value determined by zeroTxPowerSubframeConfig and assumed by PDSCH rate matching and RE mapping of UE |
| QuasiCoLocation-Index | Non-zero power CSI-RS resource index indicated by quasi-colocatgion assumption on DMRS |

A scenario of the NAICS basically relates to non-ideal backhaul. Accordingly, basically, the CoMP is not, and selectively, the CoMP scheme such as coordinated beam-foaming (CBF) and dynamic point selection (DPS)/DPB may be considered.

Hereinafter, a method for removing or suppressing the interference of the PDSCH, the CRS, and the CSI-RS due to the NAICS according to the embodiments of the present invention will be described.

1. Removing Interference in Environment where CoMP is not Applied

Figure 4:
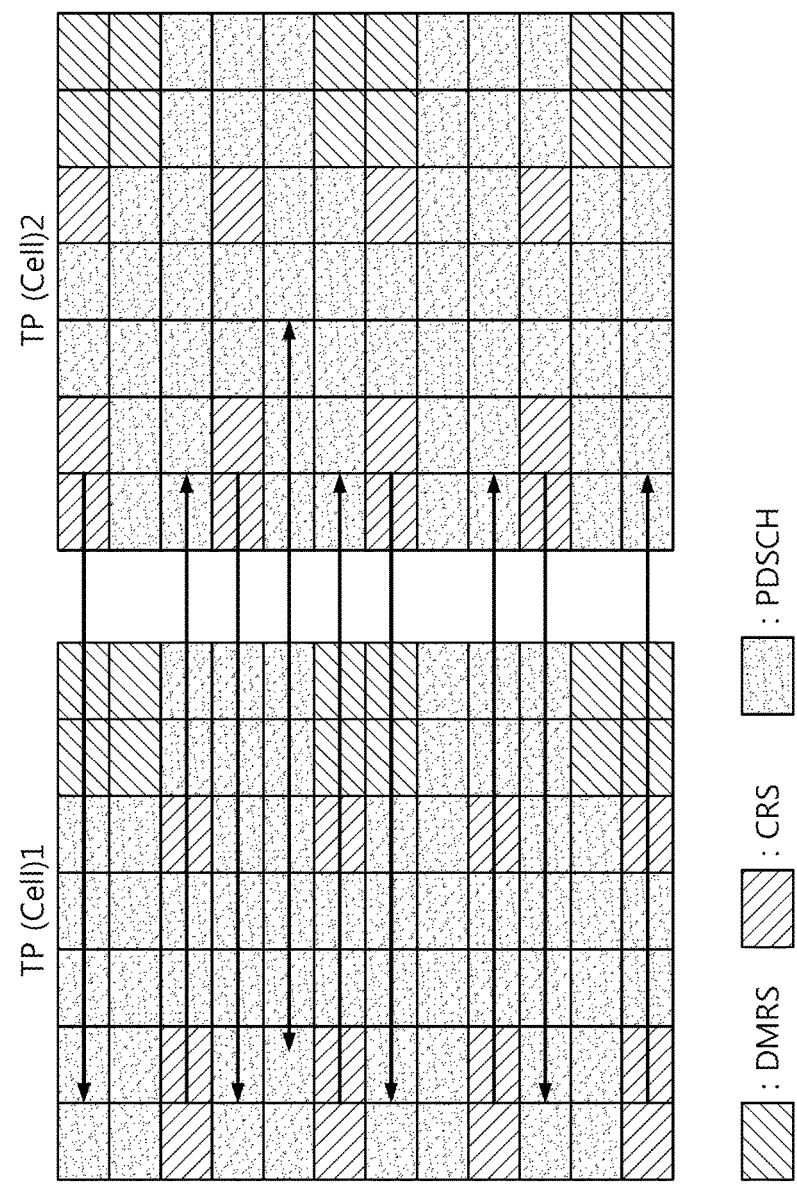
FIG. 4 is a diagram illustrating an interference situation under an environment to which the coordinated multiple point scheme is not applied.

FIG. 4 illustrates an example of a situation where interference occurs in an environment where the CoMP is not applied. Referring to FIG. 4, cases where the PDSCH is interfered largely include two types. One type is interference due to the neighbor cell, and the other type is interference the PDSCH of the neighbor cell. The interference may be removed or minimized by using optimized information supported by the network. Hereinafter, a method of removing or minimizing the two types of interference will be described together.

As a semi-static method, the eNB configures one parameter set in order to indicate the interference due to the CRS and the PDSCH of the neighbor cell to the UE. Herein, the UE may be UE in which the NAICS is possible. An example of the parameter set is as the following Table 2.

TABLE 2

| Parameter set | Content |
|---|---|
| CRS interference information | Scrambling code ID Integer value in range of [0.503] Number of CRS ports Integer value of 1, 2, or 4 MBSFN subframe configuration |
| PDSCH interference information | Power ratio of CRS to PDSCH PB and PA Probability (possibility) of modulation scheme |

Referring to Table 2, one parameter set includes information of various categories. For example, as illustrated in Table 2, the parameter set includes CRS interference information and PDSCH interference information.

First, the CRS interference information may be CRS configuration information of the neighbor cell. For example, the CRS interference information includes a scrambling code ID, the number of CRS ports, and MBSFN subframe configuration information. Based on the CRS interference information of the neighbor cell, the CRS interference in which the neighbor cell is given to the serving cell may be removed. A detailed method of removing the CRS interference will be described below.

In addition, the PDSCH interference information includes a power ratio of the CRS to the PDSCH (alternatively, PB and/or PA), and probability (possibility) information of a modulation scheme. The power ratio of the CRS to the PDSCH and the probability (possibility) information of the modulation scheme are used for suppressing the PDSCH interference of the neighbor cell.

Hereinafter, the power ratio of the CRS to the PDSCH will be described.

The PDSCH and the CRS are transmitted by different power. Based on the information on the power, the UE may estimate whether the interference from the PDSCH of a specific cell is received by some power (alternatively, some ratio). Accordingly, the UE may more exactly suppress the interference. A detailed method of removing the PDSCH interference will be described below.

Further, in the transmission based on a demodulation reference signal (DMRS), the power of the DMRS is the same as the power of the PDSCH in 16QAM and 64QAM modulation. In the QPSK, since the power of the DMRS may be different from the power of the PDSCH, the power ratio of the DMRS to the PDSCH in the QPSK may be estimated based on information illustrated in Table 6.

Hereinafter, the probability (possibility) of the modulation scheme will be described.

In order to suppress the inference by a minimum mean square error (MMSE) receiver, information on correlation values is very important. The correlation values in different modulation schemes are different from each other. Since the scheduling by the eNB is dynamically performed, exactly reconfiguring the modulation scheme by the RRC in each subband is impossible. Further, it is very difficult to exchange dynamic scheduling information between the eNBs by the non-ideal backhaul. However, the eNB may predict probability of each modulation scheme for a relatively long period based on the CSI feedback of all the UEs. Accordingly, performance of the MMSE IRC may be improved. A detailed method will be described below. The following Table 3 illustrates an example for probability of different modulation schemes when all the resources are scheduled to the UE in the neighbor cell.

TABLE 3

| Modulation scheme | Probability |
| --- | --- |
| QPSK | 0.3 |
| 16QAM | 0.4 |
| 64QAM | 0.3 |

Referring to Table 3, probability that the QPSK is applied to the specific UE is 0.3, probability that the 16QAM is applied is 0.4, and probability that the 64QAM is applied is 0.3. The sum of the probabilities may be the same as 1 or smaller than 1.

When an NAICS is increased by the semistatic scheduling in the network, interference factors such as the modulation will end a static state. The scheme may automatically support this case. In this case, a probability value of different modulation schemes except form one modulation scheme is 0. For example, when one UE has a PDSCH of the neighbor cell by the 16QAM in the RRC information by the semistatic scheduling, the probability of the 16QAM is 1 and the probability of the QPSK and the 64QAM is 0. The following Table 4 illustrates such an example.

TABLE 4

| Modulation scheme | Probability |
| --- | --- |
| QPSK | 0 |
| 16QAM | 1 |
| 64QAM | 0 |

Meanwhile, when information of Table 2 is illustrated as RRC signaling, the information is illustrated in Table 5 given below.

```
NAICS-Config-r12 ::=          SEQUENCE {
    NeighCellsCRS-Info-r11 ::=        CHOICE {
        release               NULL,
        setup                     CRS-AssistanceInfoList-r11
}
CRS-AssistanceInfoList-r12 ::= SEQUENCE  (SIZE  (1..maxCellReport))  OF  CRS-
AssistanceInfo-r11
CRS-AssistanceInfo-r12 ::= SEQUENCE {
    physCellId-r12              PhysCellId,
    antennaPortsCount-r12       ENUMERATED {an1, an2, an4, spare1},
    mbsfn-SubframeConfigList-r12  MBSFN-SubframeConfigList,
    ...
}
NeighCellsPDSCH-Info-r12 ::=        CHOICE {
    release                  NULL,
    setup                    PDSCH-AssistanceInfoList-r12
}
PDSCH-AssistanceInfo-r12 ::= SEQUENCE {
    p-b                          INTEGER (0..3)
    p-a                          ENUMERATED {
                                 dB-6, dB-4dot77, dB-3, dB-1dot77,
                                 dB0, dB1, dB2, dB3},
        Probability-QPSK-r12     ENUMERATED    {0,    0.1,    0.2,    0.3,
0.4,0.5,0.6,0.7,0.8,0.9,1},
        Probability-16QAM-r12    ENUMERATED    {0,    0.1,    0.2,    0.3,
0.4,0.5,0.6,0.7,0.8,0.9,1},
        Probability-64QAM-r12    ENUMERATED    {0,    0.1,    0.2,    0.3,
0.4,0.5,0.6,0.7,0.8,0.9,1},
    ...
}
    ...
}
```

Referring to Table 5, the RRC signaling largely includes CRS-AssistanceInfoList-r12 and PDSCH-AssistanceInfo-r12. Here, the CRS-AssistanceInfoList-r12 represents the CRS interference information, and the PDSCH-AssistanceInfo-r12 represents the PDSCH interference information.

First, the CRS-AssistanceInfoList-r12 includes physCellId-r12, antennaPortsCount-r12, and mbsfn-SubframeConfigList-r12. A physCellId-r12 scrambling code ID has an integer value in the range of [0,503]. The number of antennaPortsCount-r12 CRS ports has an integer value of 1, 2, or 4. The mbsfn-SubframeConfigList-r12 represents the MBSFN subframe configuration.

Further, the PDSCH-AssistanceInfo-r12 includes p-a and p-b (power ratios PA and PB of the CRS to the PDSCH), and Probability-QPSK-r12, Probability-16QAM-r12, and Probability-64QAM-r12. The Probability-QPSK-r12 represents probability to be modulated to the QPSK from the PDSCH of the neighbor cell, and a value thereof may have 0 and 1. The Probability-16QAM-r12 represents probability to be modulated to the 16QAM from the PDSCH of the neighbor cell, and a value thereof may have 0 and 1. Further, the Probability-64QAM-r12 represents probability to be modulated to the 64QAM from the PDSCH of the neighbor cell, and a value thereof may have 0 and 1.

The embodiment may be applied to another channel as well as the PDSCH. In the detection of the ePDCCH, since the ePDCCH is allocated to the PDSCH region, the ePDCCH is placed in the same interference as the PDSCH. Accordingly, the ePDCCH may also use the information as it is.

According to another embodiment of the present invention, the interference in the ePDCCH may be removed.

In more detail, the interference information of the ePDCCH may include an ePDCCH region, a power ratio of the CRS to the ePDCCH, and information of QPSK probability (possibility) in the ePDCCH. In the case of the ePDCCH, even though the ePDCCH of the neighbor cell is allocated in the PDCCH region, the modulation scheme is only the QPSK, and since the ePDCCH region is semistatically configured by the RRC signaling, the ePDCCH is also static. Accordingly, when the information is set to the UE, the UE may suppress the interference from the ePDCCH. Further, since the power of the ePDCCH may be increased, the power ratio of the ePDCCH may be included in the RRC signaling.

According to yet another embodiment of the present invention, the interference in the PDCCH may also be removed.

In the case of the PDCCH, since the control region exits, the PDCCH is placed in interference different from the PDSCH. If all the cells have the same control region, the interference of the PDCCH exists only in the QPSK. However, since the control region is not completely used at all times, the probability of the QPSK in the control region may be included in the RRC signaling. Like the ePDCCH, since the power of the PDCCH may be increased, the power ratio of the PDCCH may be included in the RRC signaling.

The information on the ePDCCH and the PDCCH in all the interference channels for the NAICS may be included in a parameter set of the following Table 6.

TABLE 6

| Parameter set | Information content |
|---|---|
| CRS interference information | Scrambling code ID<br>Integer value in range of [0, 503]<br>Number of CRS ports<br>Integer value of 1, 2, or 4<br>MBSFN subframe configuration |
| PDSCH interference information | Power ratio of CRS to PDSCH<br>PB and PA<br>Probability (possibility) of modulation scheme |
| PDCCH interference information | Power ratio of CRS to PDCCH<br>QPSK probability (possibility) in PDCCH |
| ePDCCH interference information | ePDCCH region (resource)<br>Power ratio of CRS to ePDCCH<br>QPSK probability (possibility) in ePDCCH |
| DMRS interference information | Power ratio of CRS to DMRS |

When a parameter set of Table 6 is represented by the RRC signaling, the parameter set is illustrated in Table 7.

```
NAICS-Config-r12 ::=              SEQUENCE {
       NeighCellsCRS-Info-r11 ::=                    CHOICE {
           release                       NULL,
           setup                                     CRS-AssistanceInfoList-r11
}
CRS-AssistanceInfoList-r12 ::= SEQUENCE        (SIZE   (1..maxCellReport))  OF  CRS-
AssistanceInfo-r11
CRS-AssistanceInfo-r12 ::= SEQUENCE {
       physCellId-r12                                PhysCellId,
       antennaPortsCount-r12                         ENUMERATED {an1, an2, an4, spare1},
       mbsfn-SubframeConfigList-r12                  MBSFN-SubframeConfigList,
       ...
}
NeighCellsPDSCH-Info-r12 ::=                  CHOICE {
       release                       NULL,
       setup                                         PDSCH-AssistanceInfoList-r12
}
PDSCH-AssistanceInfo-r12 ::= SEQUENCE {
       p-b                                                   INTEGER (0..3)
       p-a                                                   ENUMERATED {
                                                             dB-6, dB-4dot77, dB-3, dB-1dot77,
                                                             dB0, dB1, dB2, dB3},
           Prability-QPSK-r12         ENUMERATED    {0,    0.1,   0.2,    0.3,
0.4,0.5,0.6,0.7,0.8,0.9,1},
           Prability-16QAM-r12        ENUMERATED    {0,    0.1,   0.2,    0.3,
0.4,0.5,0.6,0.7,0.8,0.9,1},
```

```
        Prability-64QAM-r12          ENUMERATED        {0,     0.1,    0.2,    0.3,
0.4,0.5,0.6,0.7,0.8,0.9,1},
        ...
}
PDCCH-AsistanceInfo-r12 ::= SEQUENCE {
        p-b                                  INTEGER (0..3)
        p-a                                  ENUMERATED {
                                             dB-6, dB-4dot77, dB-3, dB-1dot77,
                                             dB0, dB1, dB2, dB3},
        Prability-QPSK-r12           ENUMERATED        {0,     0.1,    0.2,    0.3,
0.4,0.5,0.6,0.7,0.8,0.9,1},
        }
ePDCCH-AssistanceInfo-r12 ::= SEQUENCE {
        p-b                                  INTEGER (0..3)
        p-a                                  ENUMERATED {
                                             dB-6, dB-4dot77, dB-3, dB-1dot77,
                                             dB0, dB1, dB2, dB3},
        Prability-QPSK-r12           ENUMERATED        {0,     0.1,    0.2,    0.3,
0.4,0.5,0.6,0.7,0.8,0.9,1},
EPDCCH-SetConfig-r11 ::=             SEQUENCE {
        setConfigId-r11                           EPDCCH-SetConfigId-r11,
        transmissionType-r11                 ENUMERATED {localised, distributed},
        resourceBlockAssignment-r11          SEQUENCE{
                numberPRB-Pairs-r11                       ENUMERATED {n2, n4,
n8},
                resourceBlockAssignment-r11          BIT STRING (SIZE(4..38))
        },
        dmrs-ScramblingSequenceInt-r11       INTEGER (0..503),
        pucch-ResourceStartOffset-r11  INTEGER (0..2047),
        re-MappingQCL-ConfigId-r11           PDSCH-RE-MappingQCL-ConfigId-r11
        OPTIONAL, -- Need OR
        ...
}
        }
DMRS-AsistanceInfo-r12 ::= SEQUENCE {
        p-b                                  INTEGER (0..3)
        p-a                                  ENUMERATED {
                                             dB-6, dB-4dot77, dB-3, dB-1dot77,
                                             dB0, dB1, dB2, dB3},
}
...
}
```

Here, CRS-AssistanceInfoList-r12 represents CRS interference information, PDSCH-AssistanceInfo-r12 represent PDSCH interference information, ePDCCH-AssistanceInfo-r12 represents ePDCCH interference information, and DMRS-AssistanceInfo-r12 represents DMRS interference information.

First, the CRS-AssistanceInfoList-r12 includes physCelIId-r12, antennaPortsCount-r12, and mbsfn-SubframeConfigList-r12. A physCelIId-r12 scrambling code ID has an integer value in the range of [0,503]. The number of antennaPortsCount-r12 CRS ports has an integer value of 1, 2, or 4. The mbsfn-SubframeConfigList-r12 represents the MBSFN subframe configuration.

Further, the PDSCH-AssistanceInfo-r12 includes p-a and p-b (power ratios PA and PB of the CRS to the PDSCH), and Probability-QPSK-r12, Probability-16QAM-r12, and Probability-64QAM-r12. The Probability-QPSK-r12 represents probability to be modulated to the QPSK from the PDSCH of the neighbor cell, and a value thereof may have 0 and 1. The Probability-16QAM-r12 represents probability to be modulated to the 16QAM from the PDSCH of the neighbor cell, and a value thereof may have 0 and 1. Further, the Probability-64QAM-r12 represents probability to be modulated to the 64QAM from the PDSCH of the neighbor cell, and a value thereof may have 0 and 1.

The PDCCH-AsistanceInfo-r12 includes p-a and p-b (power ratios PA and PB of the CRS to the PDCCH), and Probability-QPSK-r12, Probability-16QAM-r12, and Probability-64QAM-r12. The Probability-QPSK-r12 represents probability to be modulated to the QPSK from the PDCCH of the neighbor cell, and a value thereof may have 0 and 1. Since the PDCCH is modulated to only the QPSK, information on probability to be modulated to the 16QAM or the 64QAM needs not to be used.

The ePDCCH-AsistanceInfo-r12 includes p-a and p-b (power ratios PA and PB of the CRS to the PDCCH), and Probability-QPSK-r12. The Probability-QPSK-r12 represents probability to be modulated to the QPSK from the PDCCH of the neighbor cell, and a value thereof may have 0 and 1. Since the ePDCCH is modulated to only the QPSK, information on probability to be modulated to the 16QAM or the 64QAM needs not to be used.

The DMRS-AsistanceInfo-r12 includes p-a and p-b (power ratios PA and PB of the CRS to the PDCCH).

2. Removing Interference in Environment where CoMP is Applied

The CoMP has been supported by a scheme of avoiding interference between cells through coordination for the current system. In order to support a homogeneous network by some used schemes, an eNB having higher or lower transmission power has been proposed. Different eNBs may have the same or different cell IDs.

The CoMP scheme includes three types. A first scheme is joint transmission in which a plurality of cells including a serving cell simultaneously transmits PDSCHs, and the second scheme is a dynamic point selection (DPS). In this scheme, only one eNB transmits the PDSCH. A third scheme is a CS/CB scheme, and even in this scheme, only one eNB transmits the PDSCH. The eNB may be changed only in semi-static.

It is difficult to remove interference from the CRS in the CoMP. The reason is that the CRS may not be blanked. In the CoMP, when different eNBs have different IDs, serious interference from the CRS of the neighbor eNB may exist. In a small cell, the CRS interference is more serious. However, according to the embodiment of the present invention, the CRS interference may be efficiently removed.

Figure 5:
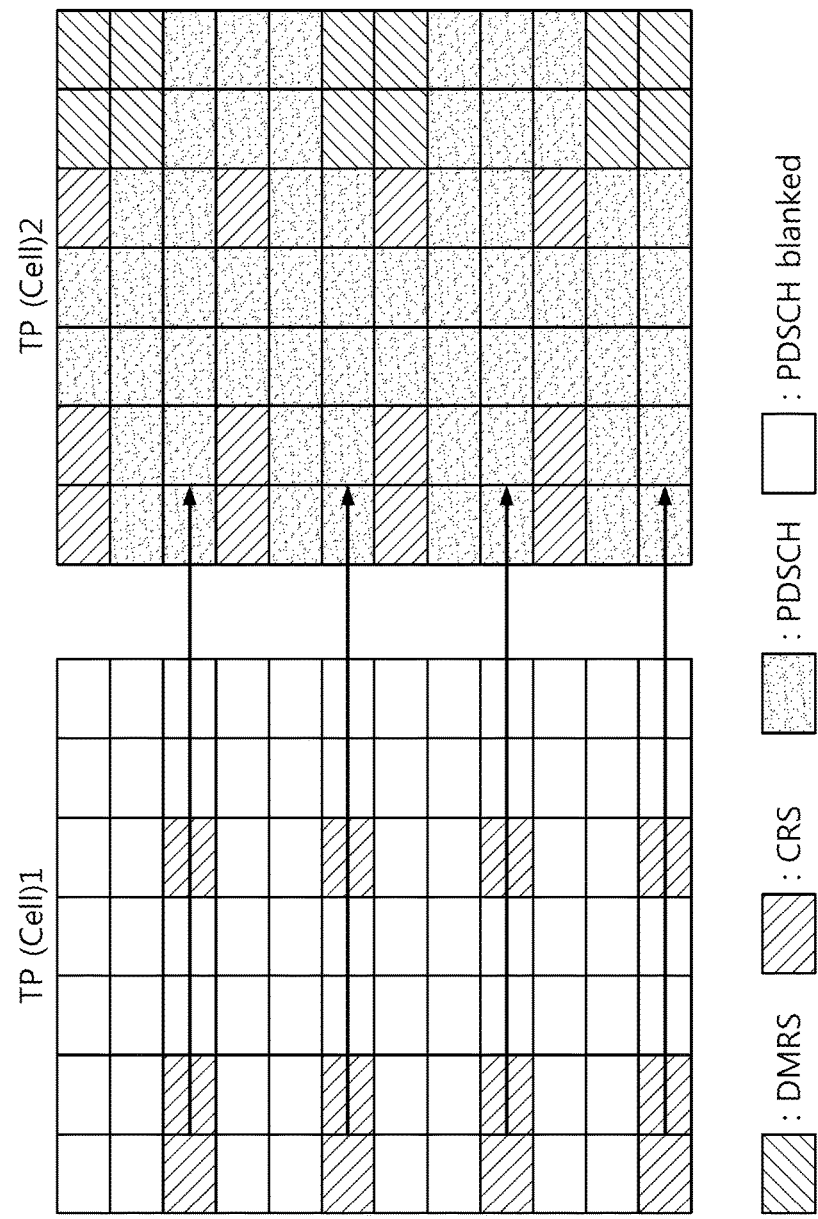
FIG. 5 is a diagram illustrating an interference situation under an environment to which the coordinated multiple point scheme is applied.

FIG. 5 illustrates an example of a situation where interference occurs in an environment where the CoMP is applied. Referring to FIG. 5, in the environment where the CoMP is applied, the UE may RE-map only one CRS. When different eNBs have different cell IDs, interference from the CRS of the neighbor eNB may occur. The problem is more serious when the PDSCH of the neighbor eNB is blanked. TP1 and TP2 exist, and the TP2 is selected as PeNB of one UE by the DPS. In order to reduce the interference, the PDSCH in the same PRB of the TP1 is blanked. However, the CRS existing in the PRB of the PRB may not be blanked. Accordingly, some REs in the PDSCH of the UE still have the interference from the TP1. When an MCS level is set in the case of no interference, some REs may have the interference from the TP1, and in this case, the CQI may be mismatched. According to the embodiment of the present invention, the interference due to the situation may be removed.

Generally, the interference from the CSI-RS of the neighbor cell is not a serious problem. The reason is that the PDSCH RE is muted by the ZP-CSI-RS when the PDSCH RE is used for the CSI-RS of the neighbor cell. The interference from the CSI-RS may cause two problems below.

The eNB does not mute the PDSCH RE in order to reduce overhead for the CSI-RS of the neighbor cell. Accordingly, the ZP-CSI-RS of the serving cell does not overlap with the CSI-RS of the neighbor cell.

In the case of the CoMP, a plurality of ZP-CSI-RSs may be configured. In one subframe, in order to map the PDSCH RE, only the ZP-CSI-RS of only one transmission eNB is selected. In the DPS, when the transmission eNB is not the serving cell, some CSI-RSs of the neighbor cell may not be muted. This causes the CSI-RS interference.

Figure 6:
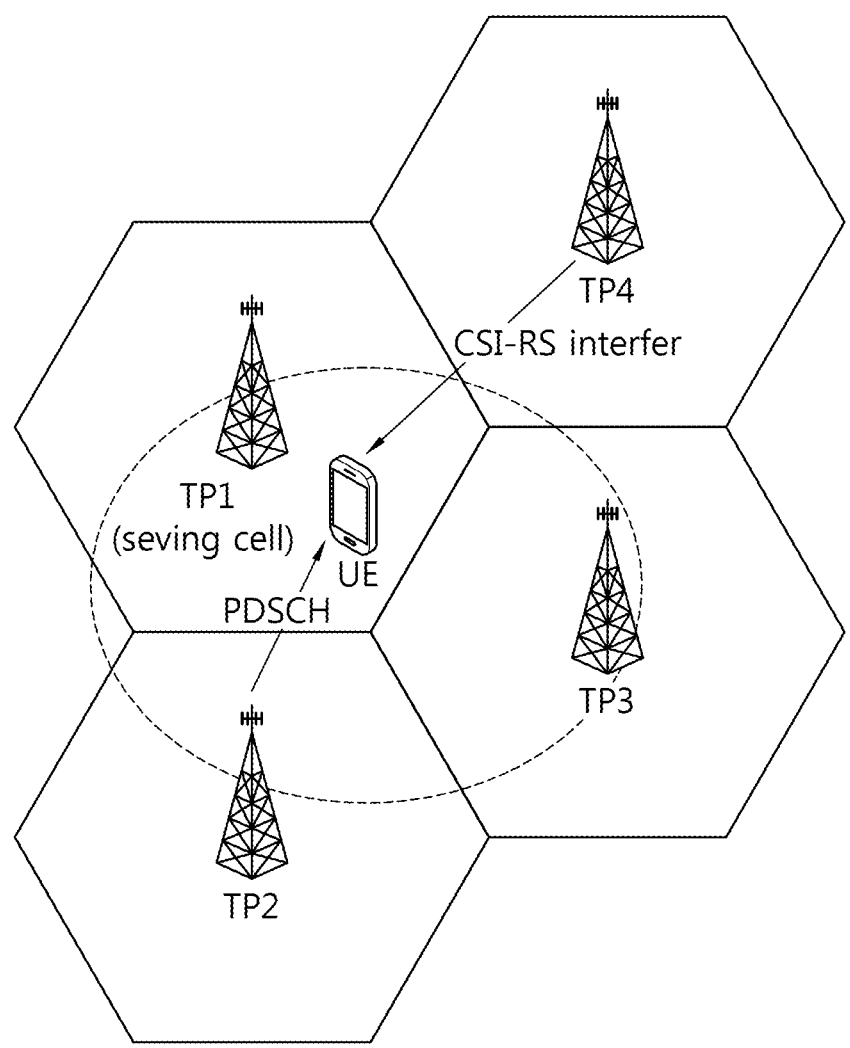
FIG. 6 is a diagram illustrating one example of a situation in which an interference occurs by a CSI-RS under a CoMP environment.

FIG. 6 is a diagram illustrating one example of a situation in which CSI-RS interference occurs under a CoMP environment.

Referring to FIG. 6, four eNBs exist, and each eNB corresponds to a TP. The CSI-RS and the ZP-CSI-RS defined by the first to fourth CSI-RSs CSI-RS1 to 4 and the first to fourth ZP-CSI-RSs ZP-CSI-RS1 to 4 are configured. The TP1, the TP2, and the TP3 are a CoMP set for one UE. Accordingly, the first to third CSI-RSs and the first to third ZP-CSI-RSs may be configured with respect to the UE. In the DPS, when the TP2 is selected as the PeNB, the first to third CSI-RSs and the second ZP-CSI-RS may be considered for the PDSCH RE mapping. Since the TP4 is not the neighbor eNB of the TP2, the fourth CSI-RS is not covered by the second ZP-CSI-RS. Accordingly, the fourth CSI-RS provides the interference to the UE in this subframe.

When the CoMP is applied, the interference from the PDSCH of the neighbor cell may be muted through coordination, and the eNB provides the CRS and CSI-RS interference information. Based on the information, the UE removes the interference by the improved receiver.

In order to remove the interference when the CoMP is applied, methods proposed in the present invention are as follows.

1) Consider CRS interference information in CoMP operation.

2) Consider CRS interference information to be removed.

3) Transmit CRS and CSI-RS interference information addition to the PDSCH RE mapping information and the QCL information to the UE.

The eNB may configure four PDSCH rate matching per one component carrier and QCL sets. Each QCL set includes two information. One is the PDSCH RE mapping information, and the other one is QCL information for one DMRS.

The following Table 8 illustrates a parameter set to be transmitted to the UE in order to remove the interference of the CRS and the CSI-RS according to the present invention.

TABLE 8

| Parameter set | Information content |
| --- | --- |
| PDSCH RE mapping information | CRS pattern information for PDSCH RE mapping<br>PDSCH starting point<br>ZP-CSI-RS for PDSCH RE mapping |
| QCL information for DMRS | CSI-RS estimating QCL for DMRS |
| NAICS information | CRS information to be removed<br>CSI-RS information to be removed<br>PDSCH information to be removed |

In order to indicate the CRS information for removing the interference, the eNB needs to notify a detailed order to the UE. The CRS information field to be indicated for the NAICS is illustrated in Table 9 below.

TABLE 9

| Field | Content |
| --- | --- |
| $n_{CRS\_ic}$ | Number of CRS ports<br>One integer value of 1, 2, and 4 |
| Scrambling code ID | Cell ID to remove CRS<br>Integer value in range of [0, 503] |
| MBSFN subframe configuration | MBSFN subframe configuration |

The CSI-RS information field to be indicated for removing the interference is illustrated in Table 10 below. A Pc value is not required because the Pc value is used for the CSI feedback.

TABLE 10

| Field | Content |
| --- | --- |
| antennaPortsCount | Number of antenna ports used for CSI-RS transmission (1, 2, 4, or 8). |
| ResourceConfig | CSI-RS configuration defined in TS 36.211., table 6.10.5.2-1 |
| SubframeConfig | $I_{CSI-RS}$ defined in TS 36.211., table 6.10.5.3-1 |
| $N_{ID}^{CSI}$ | Virtual cell ID in initial state of CSI-RS scrambling and integer value in range of [0, 503] |

A set of PDSCH RE mapping, QCL, and NAICS parameters indicated in each code point in the DCI format 2D is illustrated in Table 11 below.

TABLE 11

| Field | Content |
| --- | --- |
| $n_{CRS}$ | Number of CRS ports<br>1, 2, 4, and integer values including preliminary values which are not attached to Rel-11 UE form |
| $v_{shift}$ | Position on frequency domain of CRS<br>Integer in range of [0, 5] |
| MBSFN subframe configuration | MBSFN subframe configuration |
| PDSCH-Start-Sym | PDSCH-Start Symbol<br>{0 or preliminary value (FFS), 1, 2, 3, and 4 (4 may be applied only when system BW <=10PRB) as value indicated by PCFICH of serving cell in the case of non-cross-carrier-scheduling or value set in upper layer in the case of cross-carrier-scheduling |
| zeroTxPowerCSI-RS | zeroTxPowerResourceConfigList, and ZP CSI-RS set value determined by zeroTxPowerSubframeConfig and assumed by PDSCH rate matching and RE mapping of UE |
| QuasiCoLocation-Index | Non-zero power CSI-RS resource index indicated by quasi-colocatgion assumption on DMRS |
| $n_{CRS\_ic}$ | Number of CRS ports for removing interference<br>One integer value of 1, 2, and 4 |
| cellID | Cell ID for CRS to be removed |
| MBSFN subframe configuration | MBSFN subframe configuration |
| antennaPortsCount | Number of antenna ports used for CSI-RS to be removed (1, 2, 4, or 8). |
| ResourceConfig | CSI-RS configuration to be removed |
| SubframeConfig | $I_{CSI-RS}$ |
| $N_{ID}^{CSI}$ | Virtual cell ID in initial state of CSI-RS scrambling and integer value in range of [0, 503] |

Referring to Table 11, only one CRS and one CSI-RS are used for the NAICS, but a plurality of CRSs and CSI-RSs may be used.

Further, the ePDCCH may be used for supporting RE mapping, QCL, and CRS/CSI-RS interference removal.

The PDSCH RE mapping, QCL, and radio resource control (RRC) signaling for the NAICS are shown in Table 12.

TABLE 12

```
RE-MappingQCLNAICSConfigToAddModList-r12 ::=     SEQUENCE    (SIZE
(1..maxRE-MapQCL-r11)) OF PDSCH-RE-MappingQCL-Config-r11
RE-MappingQCLNAICSConfigToReleaseList-r12 ::=    SEQUENCE   (SIZE   (1..maxRE-
MapQCL-r11)) OF PDSCH-RE-MappingQCLNAICS-ConfigId-r12
PDSCH-RE-MappingQCLNAICS-Config-r12 ::=          SEQUENCE {
    pdsch-RE-MappingQCLNAICS-ConfigId-r12        PDSCH-RE-MappingQCLNAICS-
ConfigId-r12,
    optionalSetOfFields-r12 SEQUENCE {
        crs-PortsCount-r11              ENUMERATED {n1, n2, n4, spare1},
        crs-FreqShift-r11               INTEGER (0..5),
        mbsfn-SubframeConfigList-r11    CHOICE {
            release                         NULL,
            setup                           SEQUENCE {
                subframeConfigList              MBSFN-
SubframeConfigList
            }
        }                                          OPTIONAL,  -- Need
ON
        pdsch-Start-r11 ENUMERATED {reserved, n1, n2, n3, n4, assigned}
    }
                                    OPTIONAL,   -- Need OP
    csi-RS-ConfigZPId-r11           CSI-RS-ConfigZPId-r11,
    qcl-CSI-RS-ConfigNZPId-r11      CSI-RS-ConfigNZPId-r11
        OPTIONAL,  --
NeighCellsCRS-Info-r11 ::=      CHOICE {
    release                             NULL,
    setup                               CRS-AssistanceInfoList-r11
}
CRS-AssistanceInfoList-r12 ::= SEQUENCE  (SIZE  (1..maxCellReport))  OF  CRS-
AssistanceInfo-r11
```

TABLE 12-continued

```
CRS-AssistanceInfo-r12 ::= SEQUENCE {
    physCellId-r12              PhysCellId,
    antennaPortsCount-r12       ENUMERATED {an1, an2, an4, spare1},
    mbsfn-SubframeConfigList-r12    MBSFN-SubframeConfigList,
    ...
}
NeighCellsCSI-RS-Info-r12 ::=    CHOICE {
    release                     NULL,
    setup                       CSI-RS-AssistanceInfoList-r12
}
CSI-RS-AssistanceInfoList-r12 ::=   SEQUENCE (SIZE (1..maxCellReport)) OF CSI-
RS-AssistanceInfo-r12
CSI-RS-AssistanceInfo-r12 ::= SEQUENCE {
    antennaPortsCount-r11       ENUMERATED {an1, an2, an4, an8},
    resourceConfig-r11          INTEGER (0..31),
    subframeConfig-r11          INTEGER (0..154),
    scramblingIdentity-r11      INTEGER (0..503),
    ...
}
Need OR
    ...
qcl-CRS-Info-r11                SEQUENCE {
    qcl-ScramblingIdentity-r11      INTEGER (0..503),
    crs-PortsCount-r11          ENUMERATED {n1, n2, n4, spare1},
    mbsfn-SubframeConfigList-r11    CHOICE {
            release                 NULL,
            setup                   SEQUENCE {
                subframeConfigList      MBSFN-
SubframeConfigList
            }
```

3. Interference Removing and Suppressing Method at Receiver Side

A receiver (in particular, UE) that receives CRS, PDSCH, PDCCH, ePDCCH, and the like may acquire a parameter aggregation based on the RRC signaling and remove or suppress the interference by using the parameter aggregation. The removal or suppression of the interference may be performed according to the following procedure.

First, a received signal without interference by the PDSCH, CSI-RS, and CRS received by the UE from a specific neighbor cell may be expressed by Equation 1 given below.

$$Y=H_iX_i+I \quad \text{[Equation 1]}$$

In the equation, $H_i$ represents a channel of the PDSCH transmitted to the UE from the PeNB. $X_i$ represents a PDSCH data symbol. I represents additive white Gaussian noise (AWGN) and other inter-cell interference which are not considered in the present invention.

A received signal with interference by the CSI-RS and the CRS received by the UE may be expressed by Equation 2 given below.

$$Y=H_iX_i+H_jS_j+I \quad \text{[Equation 2]}$$

$H_j$ is a channel from not the PeNB but other eNB. However, this transmits the CRS or the CSI-RS that gives interference. $S_j$ represents a sequence symbol of the CRS or the CSI-RS.

The UE may estimate $S_j$ without performing the detection based on the RRC signaling provided in the present invention.

When it is assumed that the estimated $H_j$ is $\hat{H}_j$, the interference may be removed by the following method.

$$\tilde{Y}=Y-\hat{H}_jS_j=H_iX_i+(H_j-\hat{H}_j)S_j+I \quad \text{[Equation 3]}$$

If performance of estimating Hj is high, that is, if $\hat{H}_j \approx H_j$, the interference from the CRS or the CSI-RS may be removed. Accordingly, all PDSCH symbols have similar performance regardless the CRS or CRI-RS interference.

The PDSCH interference from the neighbor cell received by the UE may be expressed as Equation 4 given below.

$$Y=H_iX_i+H_jX_j+I \quad \text{[Equation 4]}$$

In the equation, $X_j$ represents the PDSCH symbol of the neighbor cell.

The UE may acquire a data symbol given below by a linear receiver.

$$\hat{X}_i=WY \quad \text{[Equation 5]}$$

$$W=(\tilde{H}_i^H\tilde{H}_i+R_P+R_I)^{-1}\tilde{H}_i^H \quad \text{[Equation 6]}$$

In the equation, $R_P$ and $R_I$ are correlation values of the PDSCH interference and other interference.

$$R_P=E\{(H_jX_j)(H_jX_j)^H\}=E(H_jX_jX_j^HH_j^H)=H_jE(X_jX_j^H)H_j^H \quad \text{[Equation 7]}$$

$R_I$ as a sum of weak inter-cell interference and AWGNs may be generally assumed as the AWGN. Accordingly, the AWGN may not be suppressed and in the present invention, the AWGN value is not considered. $H_j$ may be estimated by the CRS or DMRS. If $H_j$ is estimated as $\hat{H}_j$ by the CRS, a power ratio of the PDSCH to the CRS is required. Herein, the ratio value is assumed as ρ.

A value of $E(X_jX_j^H)$ varies depending on a modulation scheme. $E(X_jX_j^H)$ in QPSK, 16QAM, and 64QAM is defined as $R_{QPSK}$, $R_{16QAM}$, and $R_{64QAM}$.

When it is assumed that probabilities of the modulation schemes QPSK, 16QAM, and 64QAM are $P_{QPSK}$, $P_{16QAM}$, and $P_{64QAM}$, respectively, the values of $E(X_jX_j^H)$ and $R_P$ are shown in Equations 8 and 9 given below.

$$E(X_jX_j^H)=P_{QPSK}R_{QPSK}+P_{16QAM}R_{16QAM}+P_{64QAM}R_{64QAM} \quad \text{[Equation 8]}$$

$$R_P=\rho\hat{H}_j(P_{QPSK}R_{QPSK}+P_{16QAM}R_{16QAM}+P_{64QAM}R_{64QAM})\hat{H}_j^H \quad \text{[Equation 9]}$$

An MMSE-IRC receiver may more efficiently suppress the PDSCH interference from the neighbor cell by the $R_P$.

Figure 7:
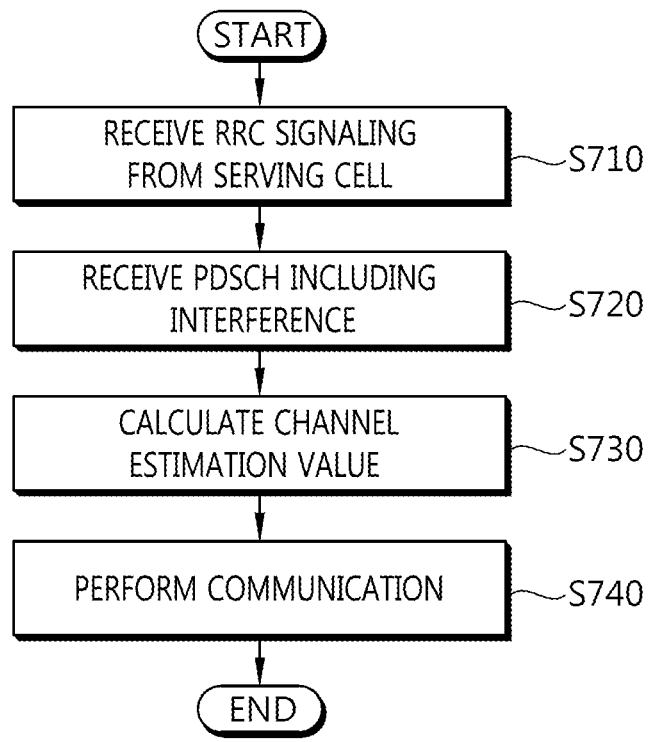
FIG. 7 is a flowchart illustrating an operating sequence of a UE for removing inter-cell interferences according to the present invention.

FIG. 7 is a flowchart illustrating an operating sequence of a UE for removing inter-cell interferences according to the present invention.

Referring to FIG. 7, first, the UE receives RRC signaling including information on interference which the CRS and the PDSCH of the neighbor cell may give to the UE and a serving cell in which a communication link is configured (S710). The RRC signaling is received from the serving cell. The information on the CRS interference includes the scrambling code ID, the number of CRS ports, and the MBSFN subframe configuration. The scrambling code ID has an integer value in the range of 0 to 503 and the number of CRS ports has an integer value of 1, 2, or 4.

The RRC signal may include information on the interference which the PDSCH of the neighbor cell may give to the PDSCH of the serving cell. The information on the PDSCH interference includes the power ratio of the PDSCH and the CRS and a probability of the modulation scheme. The modulation scheme may include QPSK, 16QAM, and 64QAM and the probability of the modulation scheme represents probabilities to be modulated by the respective schemes QPSK, 16QAM, and 64QAM.

Next, the UE receives the PDSCH of the serving cell including the interference of the neighbor cell (S270). For example, the PDSCH may include the interferences by the CRS and the PDSCH of the neighbor cell.

The UE that receives the PDSCH may blind-detect the PDCCH or the ePDCCH in order to acquire an approval for a downlink (DL). The blind-detection may be performed by known technology.

Next, the UE calculates a channel estimation value in the serving cell (S730). The channel estimation value is calculated based on interference included in the CRS, PDSCH, and RRC signaling including the interference. As an embodiment, the UE first acquires a first channel estimation value by using the CRS of the serving cell and derives a second channel estimation value in which the interference of the neighbor cell is removed from the first channel estimation value. In this example, the channel estimation value is acquired stepwise, but according to another embodiment, the UE may immediately calculate the channel estimation value of the serving cell by considering the interference of the neighbor cell.

A detailed calculation method is described in Equations 1 to 9 and a description thereof. Equations 1 to 3 and a description of the equations relate to a method for removing the CRS interference. Further, Equations 1 to 3 and a description of the equations relate to a method for removing the PDSCH interference by the neighbor cell. The PDSCH interference may be suppressed by calculating an MMSE detection weight. The MMSE detection weight may be calculated by Equations 4 to 7 and a description of the equations. Since only the interference in the CRS and the CSI-RS is considered under an environment to which CoMP is applied, a process of removing the PDSCH interference by the interference cell by calculating the MMSE detection weight may be omitted.

Last, the UE performs communication in the serving cell (S740). As the interferences by the CRS and the PDSCH of the neighbor cell are removed and suppressed, the performance of the communication is further improved.

In other words, the UE receives the PDSCH through the first serving cell (the serving cell); and performs a channel estimation for retrieving data from a PDSCH of the first serving cell, the channel estimation comprising: performing a first channel estimation for the PDSCH of the first serving cell based on a CRS of the first serving cell, based on interference information of the CRS of the neighbor cell, canceling an interference of the CRS of the neighbor cell from the first channel estimation, and based on the parameter relating to the power ratio of the CRS of the neighbor cell and the PDSCH of the neighbor cell, performing a second channel estimation for the PDSCH of the first serving cell by canceling an interference of the PDSCH of the neighbor cell; and perform to retrieve the data from the PDSCH of the first serving cell based on the second channel estimation. Herein the UE transmits capability information to the base station through the first serving cell via a UE capability information procedure, the UE capability information procedure includes that the capability information indicating that the UE is capable of receiving network assisted interference cancelation and suppression (NAICS) information, wherein the NAICS information is used by the UE to cancel and/or to suppress at least one of an intra-cell interference and an inter-cell interference. In this embodiments, the UE receives the RRC signal of NAICS information (including cancelation information of CRS of the neighbor cell and the PDSCH of the neighbor cell) for the serving cell, wherein the RRC message comprises a NAICS_Config message, the NAICS_Config message comprising a CRS-AssistanecInfo field having the CRS information of the neighbor cell and a PDSCH-AssistanceInfo field having the PDSCH information of the neighbor cell, wherein the PDSCH-AssistanceInfo field comprises a field for the first power parameter (p-a) and a field for the second power parameter (p-b), and wherein the field for the second power parameter (p-b) comprises at least one of 0, 1, 2, and 3, and the field for the first power parameter (p-a) comprises at least one of dB-6, dB-4dot77, dB-3, dB-1dot77, dB0, dB1, dB2, and dB3.

Figure 8:
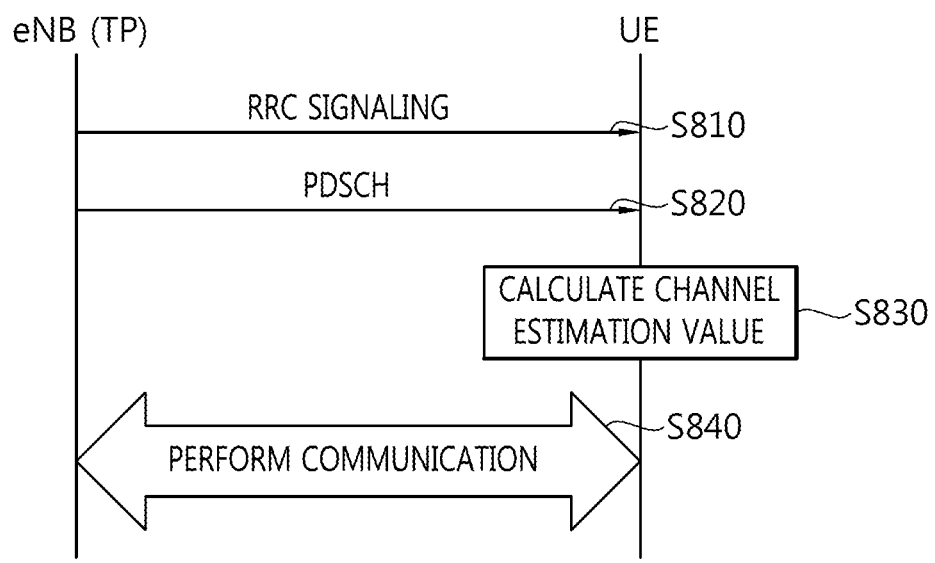
FIG. 8 is a flowchart of data for removing the inter-cell interferences according to the present invention.

FIG. 8 is a flowchart of data for removing the inter-cell interferences according to the present invention; and Referring to FIG. 8, the eNB transmits to the UE the RRC signaling including information on the interference which the CRS and the PDSCH of the neighbor cell may give to the serving cell (S810). The information on the CRS interference includes the scrambling code ID, the number of CRS ports, and the MBSFN subframe configuration. The scrambling code ID has an integer value in the range of 0 to 503 and the number of CRS ports has an integer value of 1, 2, or 4. The RRC signal may include information on the interference which the PDSCH of the neighbor cell may give to the PDSCH of the serving cell. The information on the PDSCH interference includes the power ratio of the PDSCH and the CRS and a probability of the modulation scheme. The modulation scheme may include QPSK, 16QAM, and 64QAM and the probability of the modulation scheme represents probabilities to be modulated by the respective schemes QPSK, 16QAM, and 64QAM.

Next, the eNB transmits to the UE the CRS and the PDSCH of the service cell including the interference of the neighbor cell (S820). The CRS and the PDSCH may include the interferences by the CRS and the PDSCH of the neighbor cell.

Next, the UE calculates a channel estimation value in the serving cell (S830). The channel estimation value is calculated based on interference included in the CRS, PDSCH, and RRC signaling including the interference. As an embodiment, the UE first acquires a first channel estimation value by using the CRS of the serving cell and derives a second channel estimation value in which the interference of the neighbor cell is removed from the first channel estimation value. In this example, the channel estimation value is acquired stepwise, but according to another embodiment, the UE may immediately calculate the channel estimation value of the serving cell by considering the interference of the neighbor cell.

A detailed calculation method is described in Equations 1 to 9 and a description thereof. Equations 1 to 3 and the description of the equations relate to the method for removing the CRS interference and in particular, to a method for removing the interference (hereinafter, the interference in the PDSCH) which the CRS of the neighbor cell gives to the PDSCH of the serving cell. The PDSCH interference may be suppressed by calculating the MMSE detection weight. The MMSE detection weight may be calculated by Equations 4 to 7 and a description of the equations. Since only the interference in the CRS and the CSI-RS is considered under an environment to which CoMP is applied, a process of removing the PDSCH interference by the interference cell by calculating the MMSE detection weight may be omitted.

Last, the UE performs communication in the serving cell (S840). As the interferences by the CRS and the PDSCH of the neighbor cell are removed and suppressed, the performance of the communication is further improved.

Figure 9:
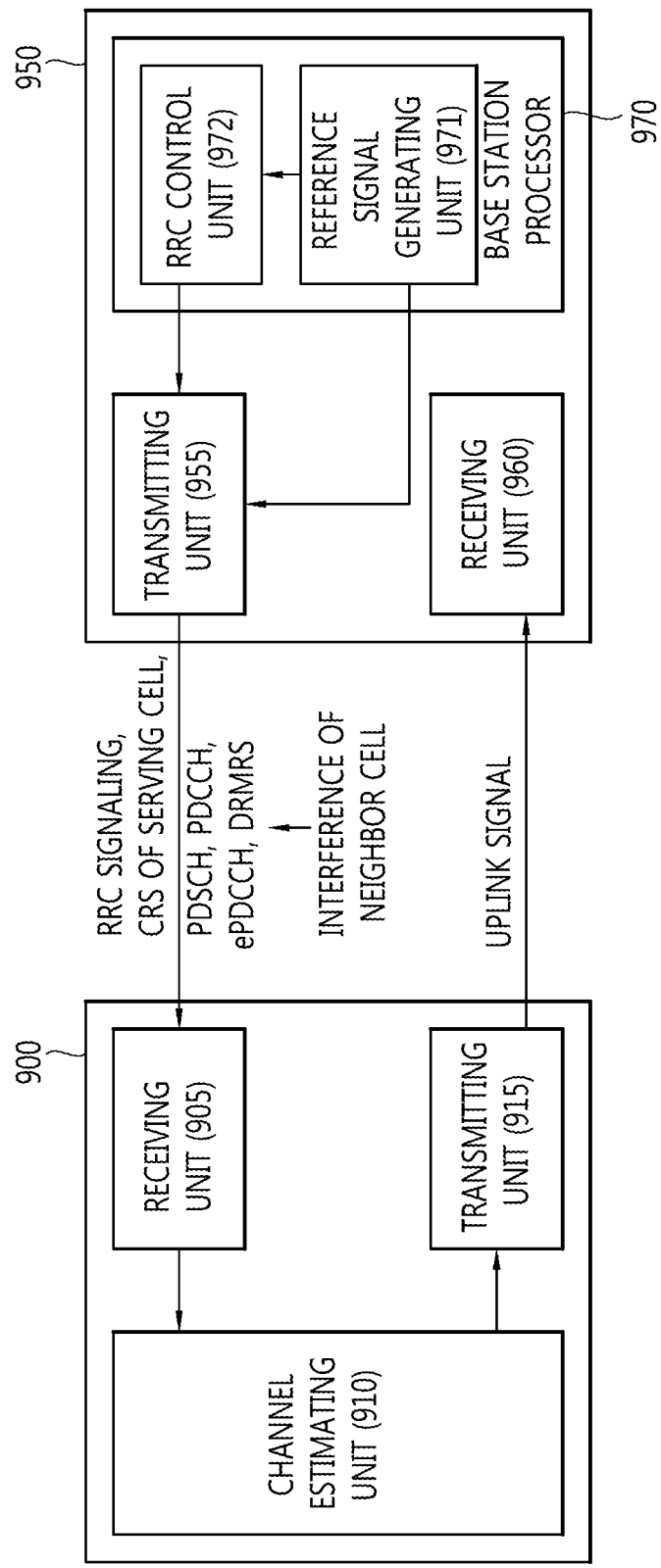
FIG. 9 is a block diagram illustrating a UE and an eNB according to one example of the present invention.

FIG. 9 is a block diagram illustrating a UE and an eNB according to one example of the present invention.

Referring to FIG. 9, the UE 900 includes a receiving unit 905, a channel estimating unit 910, and a transmitting unit 915.

The receiving unit 905 receives RRC signaling including information on interference from an eNB 950, and at least one of a CRS, a PDSCH, a PDCCH, an ePDCCH, and a DMRS of a serving cell. The receiving unit 905 receives at least one of the CRS, the PDSCH, the PDCCH, the ePDCCH, and the DMRS of the serving cell to interfere from the neighbor cell.

Information on the CRS interference includes a scrambling code ID, the number of CRS ports, and an MBSFN subframe configuration as illustrated in Table 2. The scrambling code ID has an integer value in a range of 0 to 503, and the number of CRS ports has an integer value of 1, 2, or 4. Information on the interference in the PDSCH of the serving cell from the PDSCH of the neighbor cell may be included in the RRC signaling. The information on the PDSCH interference includes a power ratio of the CRS to the PDSCH and probability (possibility) of a modulation scheme. The modulation scheme may include QPSK, 16QAM, and 64QAM, and the probability of the modulation scheme represents probability to be modulated to each scheme of QPSK, 16QAM, and 64QAM.

The channel estimating unit 910 calculates a channel estimation value in the serving cell. The channel estimation value is calculated based on the CRS and the PDSCH in which the interference is included, and the information on interference included in the RRC signaling. As an example, the channel estimating unit 910 first calculates a first channel estimation value by using the CRS of the serving cell, and deducts a second channel estimation value acquired by removing the interference of the neighbor cell from the first channel estimation value. In the example, it is described that the channel estimation values are calculated by stages, but according to another embodiment, the channel estimating unit 910 may immediately calculate channel estimation values of the serving cell by considering the interference of the neighbor cell.

The channel estimating unit 910 may perform channel estimation based on Equations 1 to 9. Equations 1 to 3 and the description of Equations relate to the method of removing the CRS interference, and more particularly, to the method of removing the interference in the PDSCH of the serving cell from the CRS of the neighbor cell. The interference in the PDSCH may be suppressed by calculating an MMSE detection weighted value. The MMSE detection weighted value may be calculated by Equations 4 to 7 and the description of Equations. Under the environment where the CoMP is applied, since only the interference in the CRS and the CSI-RS is considered, a process of removing the PDSCH interference from the neighbor cell by calculating the MMSE detection weighted value may be omitted.

The transmitting unit 915 transmits an uplink signal to the eNB 950 in the serving cell based on the channel estimation value. As the above interference from the CRS and the PDSCH of the neighbor cell is removed or suppressed, the performance of communication is more improved.

The eNB 950 includes a transmitting unit 955, a receiving unit 960, a reference signal generating unit 971, and an RRC control unit 972.

Here, the eNB 950 provides the serving cell, and transmits the CRS of the serving cell to the UE 900. The interference from the CRS and the PDSCH of the neighbor cell may be included in the CRS and the PDSCH of the neighbor cell.

The transmitting unit 955 transmits the CRS generated in the reference signal generating unit 971, the DMRS, and the RRC signaling generated in the RRC control unit 972 to the UE.

The receiving unit 960 receives an uplink signal transmitted from the transmitting unit 915 of the UE 900.

The reference signal generating unit 971 generates reference signals such as the CRS and the DMRS to transmit the generated reference signals to the transmitting unit 955.

The RRC control unit 972 generates RRC signaling including information on the interference in the serving cell from the CRS and the PDSCH of the neighbor cell to transmit the generated RRC signaling to the transmitting unit 955.

The UE 900 may establish a Radio Resource Control (RRC) connection with an eNB 950 through a serving cell (e.g., a primary serving cell) and receive an RRC message through the serving cell. The RRC message includes cell-specific reference signal (CRS) information of a neighbor cell and Physical Downlink Shared Channel (PDSCH) information of the neighbor cell, and the PDSCH information of the neighbor cell includes a parameter relating to a power ratio of a CRS of the neighbor cell and a PDSCH of the neighbor cell. The UE 900 receives the PDSCH through the serving cell and performs a channel estimation for retrieving data from a PDSCH of the serving cell.

The channel estimation includes: performing a first channel estimation for the PDSCH of the serving cell based on a CRS of the serving cell; based on interference information of the CRS of the neighbor cell, canceling an interference of the CRS of the neighbor cell from the first channel estimation; and based on the parameter relating to the power ratio of the CRS of the neighbor cell and the PDSCH of the neighbor cell, performing a second channel estimation for the PDSCH of the serving cell by canceling an interference of the PDSCH of the neighbor cell. The UE 900 retrieves the data from the PDSCH of the serving cell based on the second channel estimation.

The UE 900 may transmit capability information to the eNB 950 through a primary serving cell. The capability information may indicate that the UE 900 is capable of receiving NAICS information. The UE 900 may use the NAICS information to cancel and/or suppress at least one of an intra-cell interference and an inter-cell interference.

The capability information may be a piece of UE capability information of the UE 900.

The CRS information of the neighbor cell includes a scrambling code identification for the neighbor cell, the number of CRS ports of the neighbor cell, and a configuration of Multicast-Broadcast Single Frequency Network (MBSFN) subframe. The PDSCH information of the neighbor cell includes a first power parameter (p-a) and a second power parameter (p-b).

The RRC message may further include a NAICS_Config message, and the NAICS_Config message includes a CRS-AssistanecInfo field having the CRS information of the neighbor cell and a PDSCH-AssistanceInfo field having the PDSCH information of the neighbor cell. The PDSCH-AssistanceInfo field includes a field for the first power parameter (p-a) and a field for the second power parameter (p-b).

The field for the second power parameter (p-b) includes at least one of 0, 1, 2, and 3, and the field for the first power parameter (p-a) includes at least one of dB-6, dB-4dot77, dB-3, dB-1dot77, dB0, dB1, dB2, and dB3.

The PDSCH information of the neighbor cell includes probability information of a modulation scheme for the PDSCH of the neighbor cell, and the probability information includes probability information for a first modulation scheme and probability information of a second modulation scheme. The modulation schemes may be one of QPSK, 16QAM, and 64QAM.

the RRC message comprises CRS information of the first serving cell and PDSCH information of the first serving cell, and The PDSCH information of the serving cell may include a parameter relating to a power ratio of a CRS of the serving cell and a PDSCH of the serving cell.

The CRS information of the serving cell comprises a scrambling code identification of the first serving cell, the number of CRS ports for the serving cell, and configuration of Multicast-Broadcast Single Frequency Network (MBSFN) subframe. The PDSCH information of the serving cell includes a first power parameter (p-a) relating to the serving cell and a second power parameter (p-b) relating to the serving cell.

A field for the second power parameter (p-b) relating to the serving cell includes at least one of 0, 1, 2, and 3, and a field for the first power parameter (p-a) relating to the serving cell includes at least one of dB-6, dB-4dot77, dB-3, dB-1dot77, dB0, dB1, dB2, and dB3.

The RRC message further includes interference information of an enhanced Physical Downlink Control Channel (ePDCCH) of the neighbor cell.

The interference information of the ePDCCH of the neighbor cell includes an ePDCCH region of the neighbor cell, a parameter relating to a power ratio of the CRS of the neighbor cell and the ePDCCH of the neighbor cell, and probability information of quadrature phase shift keying (QPSK) used for the ePDCCH.

According to the present invention, the transmission performance of the PDSCH is more improved by removing the CRS interference and the CSI-RS interference and suppressing the PDSCH interference.

While the present invention has been shown and described in connection with the embodiments, it will be apparent to those skilled in the art that modifications and variations can be made without departing from the spirit and scope of the invention as defined by the appended claims. Thus, the present invention is not limited to the foregoing embodiments and may include all the embodiments within the scope of the appended claims.

What is claimed is:

1. A method of performing a wireless communication in an inter-cell interference environment, the method comprising:
    establishing a Radio Resource Control (RRC) connection with a base station through a first serving cell;
    receiving, at a User Equipment (UE), an RRC message through the first serving cell, the RRC message comprising cell-specific reference signal (CRS) information of a neighbor cell and Physical Downlink Shared Channel (PDSCH) information of the neighbor cell, and the PDSCH information of the neighbor cell comprising a parameter relating to a power ratio of a CRS of the neighbor cell and a PDSCH of the neighbor cell;
    receiving the PDSCH through the first serving cell;
    performing a channel estimation for retrieving data from a PDSCH of the first serving cell, the channel estimation comprising:
        performing a first channel estimation for the PDSCH of the first serving cell based on a CRS of the first serving cell,
        based on interference information of the CRS of the neighbor cell, canceling an interference of the CRS of the neighbor cell from the first channel estimation, and
        based on the parameter relating to the power ratio of the CRS of the neighbor cell and the PDSCH of the neighbor cell, performing a second channel estimation for the PDSCH of the first serving cell by canceling an interference of the PDSCH of the neighbor cell; and
    retrieving the data from the PDSCH of the first serving cell based on the second channel estimation.

2. The method of claim 1, further comprising:
    transmitting first capability information to the base station through the first serving cell, the capability information indicating that the UE is capable of receiving network assisted interference cancelation and suppression (NAICS) information,
    wherein the NAICS information is used by the UE to cancel and/or to suppress at least one of an intra-cell interference and an inter-cell interference.

3. The method of claim 2, wherein the first capability information is included in UE capability information of the UE.

4. The method of claim 1, wherein the CRS information of the neighbor cell comprises a scrambling code identification for the neighbor cell, the number of CRS ports of the neighbor cell, and a configuration of Multicast-Broadcast Single Frequency Network (MBSFN) subframe, and
    the PDSCH information of the neighbor cell comprises a first power parameter (p-a) and a second power parameter (p-b).

5. The method of claim 4, wherein the RRC message comprises a NAICS_Config message, the NAICS_Config message comprising a CRS-AssistanecInfo field having the CRS information of the neighbor cell and a PDSCH-AssistanceInfo field having the PDSCH information of the neighbor cell,
    wherein the PDSCH-AssistanceInfo field comprises a field for the first power parameter (p-a) and a field for the second power parameter (p-b), and
    wherein the field for the second power parameter (p-b) comprises at least one of 0, 1, 2, and 3, and the field for the first power parameter (p-a) comprises at least one of dB-6, dB-4dot77, dB-3, dB-1dot77, dB0, dB1, dB2, and dB3.

6. The method of claim 1, wherein the PDSCH information of the neighbor cell comprises probability information of a modulation scheme for the PDSCH of the neighbor cell, and the probability information comprises probability information for a first modulation scheme and probability information of a second modulation scheme.

7. The method of claim 1, wherein the RRC message comprises CRS information of the first serving cell and PDSCH information of the first serving cell, and the PDSCH information of the first serving cell comprises a parameter relating to a power ratio of a CRS of the first serving cell and a PDSCH of the first serving cell.

8. The method of claim 7, wherein the CRS information of the first serving cell comprises a scrambling code identification of the first serving cell, the number of CRS ports for the first serving cell, and configuration of Multicast-Broadcast Single Frequency Network (MBSFN) subframe, and wherein the PDSCH information of the first serving cell comprises a first power parameter (p-a) relating to the first serving cell and a second power parameter (p-b) relating to the first serving cell.

9. The method of claim 8, wherein a field for the second power parameter (p-b) relating to the first serving cell comprises at least one of 0, 1, 2, and 3, and a field for the first power parameter (p-a) relating to the first serving cell comprises at least one of dB-6, dB-4dot77, dB-3, dB-1dot77, dB0, dB1, dB2, and dB3.

10. The method of claim 1, wherein the RRC message further comprises interference information of an enhanced Physical Downlink Control Channel (ePDCCH) of the neighbor cell, and wherein the interference information of the ePDCCH of the neighbor cell comprises an ePDCCH region of the neighbor cell, a parameter relating to a power ratio of the CRS of the neighbor cell and the ePDCCH of the neighbor cell, and probability information of quadrature phase shift keying (QPSK) used for the ePDCCH.

11. A method of performing a wireless communication in an inter-cell interference environment, the method comprising:

establishing a Radio Resource Control (RRC) connection with a User Equipment (UE) through a first serving cell;

transmitting, to the UE, an RRC message through the first serving cell, the RRC message comprising cell-specific reference signal (CRS) information of a neighbor cell and Physical Downlink Shared Channel (PDSCH) information of the neighbor cell, and the PDSCH information of the neighbor cell comprising a parameter relating to a power ratio of a CRS of the neighbor cell and a PDSCH of the neighbor cell; and transmitting the PDSCH through the first serving cell, wherein the parameter relating to the power ratio of the CRS of the neighbor cell and the PDSCH of the neighbor cell is configured for the UE to cancel an interference of the PDSCH of the neighbor cell in retrieving data from the PDSCH of the first serving cell, wherein the RRC message further comprises interference information of an enhanced Physical Downlink Control Channel (ePDCCH) of the neighbor cell, and wherein the interference information of the ePDCCH of the neighbor cell comprises an ePDCCH region of the neighbor cell, a parameter relating to a power ratio of the CRS of the neighbor cell and the ePDCCH of the neighbor cell, and probability information of quadrature phase shift keying (QPSK) used for the ePDCCH.

12. The method of claim 11, further comprising:

receiving first capability information from the UE through the first serving cell, the capability information indicating that the UE is capable of receiving network assisted interference cancelation and suppression (NAICS) information; and transmitting the NAICS information for the UE to cancel and/or to suppress at least one of an intra-cell interference and an inter-cell interference.

13. The method of claim 12, wherein the first capability information is included in UE capability information of the UE.

14. The method of claim 11, wherein the CRS information of the neighbor cell comprises a scrambling code identification for the neighbor cell, the number of CRS ports of the neighbor cell, and a configuration of Multicast-Broadcast Single Frequency Network (MBSFN) subframe, and the PDSCH information of the neighbor cell comprises a first power parameter (p-a) and a second power parameter (p-b).

15. The method of claim 14, wherein the RRC message comprises a NAICS_Config message, the NAICS_Config message comprising a CRS-AssistanecInfo field having the CRS information of the neighbor cell and a PDSCH-AssistanceInfo field having the PDSCH information of the neighbor cell, wherein the PDSCH-AssistanceInfo field comprises a field for the first power parameter (p-a) and a field for the second power parameter (p-b), and wherein the field for the second power parameter (p-b) comprises at least one of 0, 1, 2, and 3, and the field for the first power parameter (p-a) comprises at least one of dB-6, dB-4dot77, dB-3, dB-1dot77, dB0, dB1, dB2, and dB3.

16. The method of claim 11, wherein the PDSCH information of the neighbor cell comprises probability information of a modulation scheme for the PDSCH of the neighbor cell, and the probability information comprises probability information for a first modulation scheme and probability information of a second modulation scheme.

17. The method of claim 11, wherein the RRC message comprises CRS information of the first serving cell and PDSCH information of the first serving cell, and the PDSCH information of the first serving cell comprises a parameter relating to a power ratio of a CRS of the first serving cell and a PDSCH of the first serving cell.

18. The method of claim 17, wherein the CRS information of the first serving cell comprises a scrambling code identification of the first serving cell, the number of CRS ports for the first serving cell, and configuration of Multicast-Broadcast Single Frequency Network (MBSFN) subframe, and wherein the PDSCH information of the first serving cell comprises a first power parameter (p-a) relating to the first serving cell and a second power parameter (p-b) relating to the first serving cell.

19. The method of claim 18, wherein a field for the second power parameter (p-b) relating to the first serving cell comprises at least one of 0, 1, 2, and 3, and a field for the first power parameter (p-a) relating to the first serving cell comprises at least one of dB-6, dB-4dot77, dB-3, dB-1dot77, dB0, dB1, dB2, and dB3.

20. A method of performing a wireless communication in an inter-cell interference environment, the method comprising:

establishing a Radio Resource Control (RRC) connection with a User Equipment (UE) through a first serving cell;

transmitting, to the UE, an RRC message through the first serving cell, the RRC message comprising cell-specific reference signal (CRS) information of a neighbor cell and Physical Downlink Shared Channel (PDSCH) information of the neighbor cell, and the PDSCH information of the neighbor cell comprising a parameter relating to a power ratio of a CRS of the neighbor cell and a PDSCH of the neighbor cell; and transmitting the PDSCH through the first serving cell, wherein the parameter relating to the power ratio of the CRS of the neighbor cell and the PDSCH of the neighbor cell is configured for the UE to cancel an interference of the PDSCH of the neighbor cell in retrieving data from the PDSCH of the first serving cell, wherein the PDSCH information of the neighbor cell comprises a first power parameter (p-a) and a second power parameter (p-b), wherein the RRC message comprises a NAICS_Config message, the NAICS_Config message comprising a CRS-AssistanecInfo field having the CRS information of the neighbor cell and a PDSCH-AssistanceInfo field having the PDSCH information of the neighbor cell, wherein the PDSCH-AssistanceInfo field comprises a field for the first power parameter (p-a) and a field for the second power parameter (p-b), and wherein the field for the second power parameter (p-b) comprises at least one of 0, 1, 2, and 3, and the field for the first power parameter (p-a) comprises at least one of dB-6, dB-4dot77, dB-3, dB-1dot77, dB0, dB1, dB2, and dB3.

* * * * *